(12) United States Patent
Mueller-Riemer et al.

(10) Patent No.: US 11,775,593 B2
(45) Date of Patent: Oct. 3, 2023

(54) METHOD AND SYSTEM FOR GENERATING TECHNICAL DOCUMENTATION

(71) Applicant: Lenze SE (Societas Europaea), Aerzen (DE)

(72) Inventors: Guido Mueller-Riemer, Nordstemmen (DE); Gerd Schueler, Badenhard (DE); Sascha Liebig, Lemgo (DE)

(73) Assignee: Lenze SE (Societas Europaea), Aerzen (DE)

( * ) Notice: Subject to any disclaimer, the term of this patent is extended or adjusted under 35 U.S.C. 154(b) by 0 days.

(21) Appl. No.: 17/127,452

(22) Filed: Dec. 18, 2020

(65) Prior Publication Data

US 2021/0191992 A1    Jun. 24, 2021

(30) Foreign Application Priority Data

Dec. 20, 2019 (DE) ...................... 10 2019 220 465.1

(51) Int. Cl.
*G06F 16/93* (2019.01)
*G06F 16/9538* (2019.01)

(52) U.S. Cl.
CPC .......... *G06F 16/93* (2019.01); *G06F 16/9538* (2019.01)

(58) Field of Classification Search
CPC ...... G06F 16/93; G06F 16/9538; Y02P 90/30; G06Q 10/06; G06Q 50/04
See application file for complete search history.

(56) References Cited

U.S. PATENT DOCUMENTS

| 7,702,636 | B1* | 4/2010 | Sholtis ................. G06F 16/256 707/999.1 |
| 2005/0010431 | A1* | 1/2005 | Uy ..................... G06Q 10/0831 705/331 |
| 2013/0201316 | A1* | 8/2013 | Binder .................... H04L 67/12 701/2 |
| 2019/0137983 | A1* | 5/2019 | Subramaniyan ........ G06F 17/18 |

FOREIGN PATENT DOCUMENTS

DE    10 2006 059 829 A1    6/2008

OTHER PUBLICATIONS

German-language Office Action issued in German Application No. 10 2019 220 465.1 dated Nov. 2, 2020 (14 pages).

* cited by examiner

*Primary Examiner* — Mariela Reyes
*Assistant Examiner* — Fatima P Mina
(74) *Attorney, Agent, or Firm* — Crowell & Moring LLP

(57) ABSTRACT

A method and a system for generating a technical documentation of a configurable product of an electrical drive system is provided. The method includes selecting the product from a quantity of selectable products by a user, automatically generating a data record of the selected product the data record containing classification data and product data, and transmitting the data record to at least one service configured to extract the classification data from the received data record, extract documentation data from the product data based on the extracted classification data, and generate a partial documentation of the technical documentation based on the extracted documentation data.

4 Claims, 1 Drawing Sheet

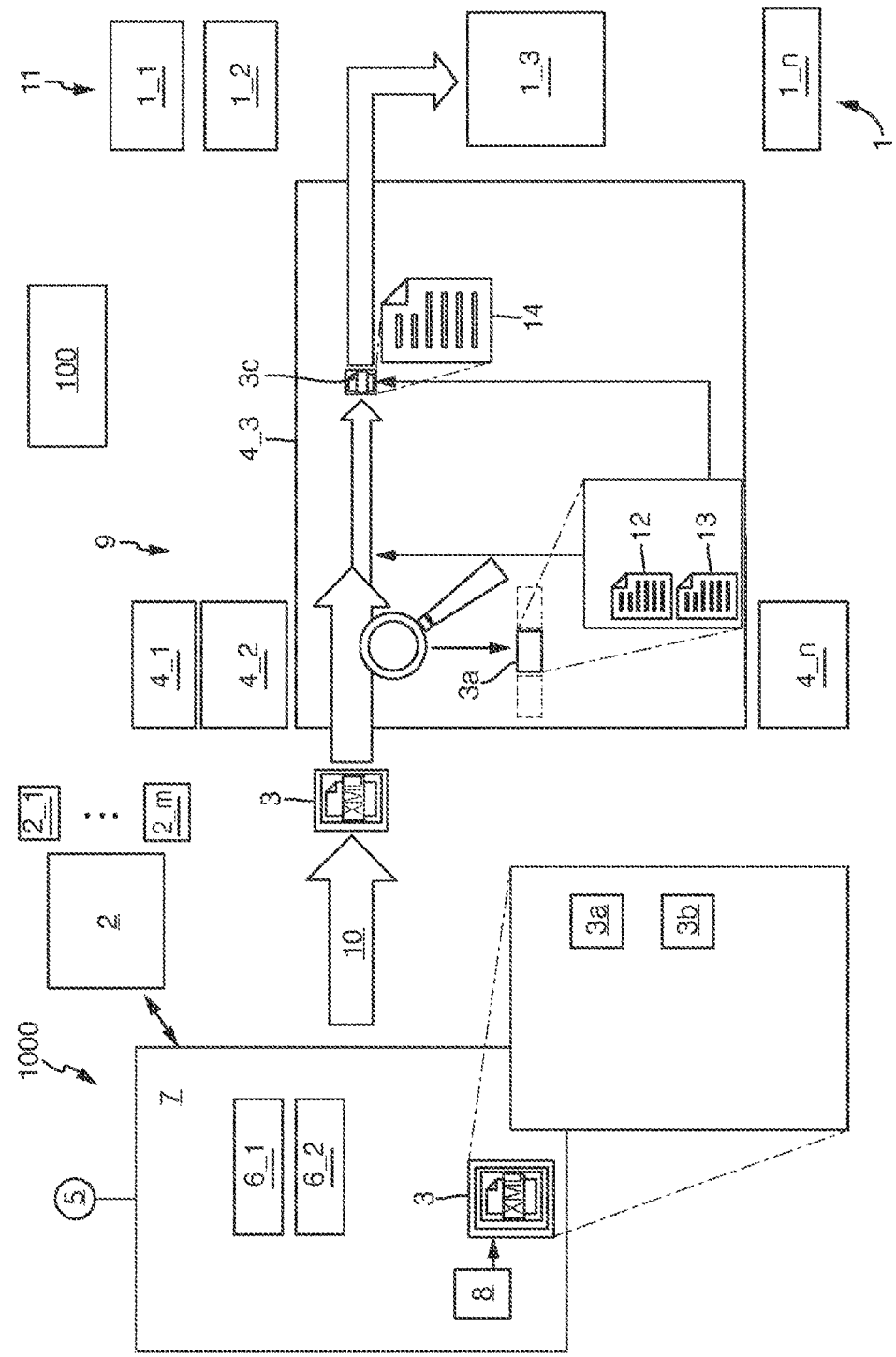

METHOD AND SYSTEM FOR GENERATING TECHNICAL DOCUMENTATION

CROSS REFERENCE TO RELATED APPLICATION

This application claims priority under 35 U.S.C. § 119 from German Patent Application No. 10 2019 220 465.1, filed Dec. 20, 2019, the entire disclosure of which is herein expressly incorporated by reference.

BACKGROUND AND SUMMARY OF THE INVENTION

The invention relates to a method and to a system for generating a technical documentation of a configurable product of an electrical drive system.

The invention is based on the objective of providing a method and a system for generating a technical documentation of a configurable product of an electrical drive system, which make generation of the technical documentation as simple and as flexible as possible.

The method according to the invention serves to generate a technical documentation of a user-configurable product, wherein the product is a component of an electrical drive system.

The method comprises the following steps.

To start with, a product or a type of product is selected from a quantity of selectable products or types of products by a user. A user-specific configuration of the product may follow as required.

Subsequently, a data record of the selected product is automatically generated, wherein the data record contains classification data, in particular concerning the type of selected product, and product data.

Subsequently, the generated data record is transmitted to at least one service of a multiplicity of different services. The transmission of the generated data record can only take place when there is a service call, i.e. the service itself pulls the data record. This has the advantage that the data source does not have to know, which services are available. Also the data record itself cannot be generated until a respective service is called up.

A respective service of the multiplicity of different services is configured to extract the classification data from the received data record, to extract documentation data from the product data based on the extracted classification data and to generate a partial documentation of the technical documentation based on the extracted documentation data.

According to one embodiment, the method comprises the further steps: transmission of the data record to a multiplicity of different services and forming the technical documentation by combining the partial documentations of the services.

The technical documentation may for example be embodied as a structured data record or as a file in a certain format, which can be displayed by means of a viewer, for example in the form of a web browser, and which can be further processed digitally at random.

According to one embodiment, a recipe stored in a respective service is selected by way of the extracted classification data, wherein the documentation data are extracted or filtered from the product data by way of the selected recipe.

According to one embodiment, a set of rules stored in a respective service is selected by way of the extracted classification data, wherein a digital model of the product is generated based on the extracted documentation data and the selected set of rules.

According to one embodiment, the data record of the selected product is automatically generated in that the data record or the specific data thereof is/are read from a database, for example a merchandise management system and subsequently is/are inserted into the data record.

According to one embodiment, the selectable products contain the following products or types of products: transmissions, frequency converters, programmable logic controllers, analog sensors, digital sensors, rotary encoders, electric motors, mechanical elements or random combinations thereof.

According to one embodiment, the multiplicity of different services contain the following services or types of services: a CAD service, which is configured to generate partial documentations in the form of CAD data of the selected product, an online help service, which is configured to generate partial documentations in the form of online help data of the selected product, and a product datasheet service, which is configured to generate partial documentations in the form of product data of the selected product.

According to one embodiment, once the product has been selected, adjustable parameters of the selected product are set by the user insofar as desired, wherein the data record of the selected product is dependent on the set parameters.

According to one embodiment, the data record is configured as a file in XML, format or JSON format. The small file size is of advantage here. Therefore, the data record can for example be generated within a short time and a merely small load on the network is caused during the transmission of the data record.

The system according to the invention serves to generate a technical documentation of a configurable product of an electrical drive system. The system is in particular configured to execute the above-described method.

The system comprises a user interface, for example in the form of a web surface and/or an app, which is configured for selecting the product or a type of product from a quantity of selectable products, in particular of different type.

The system further comprises a data record generating unit, which is configured to automatically generate a data record of the selected product, wherein the data record contains classification data and product data.

The system further comprises a service computing unit on which a multiplicity of different services are executed.

The system further comprises a data transmission unit, for example in the form of a conventional data network, which is configured to transmit the data record from the data record generating unit to the service computing unit.

A respective service of the multiplicity of different services is configured to extract the classification data from the received data record, to extract documentation data from the product data based on the extracted classification data and to generate a partial documentation of the technical documentation based on the extracted documentation data.

The system further comprises a documentation unit, which is configured to form the technical documentation by combining the service-specific partial documentations.

The user interface according to the invention, for example in the form of a web surface/app, is linked to several services of a so-called service landscape, wherein the services are responsible for the demand-orientated generation of the associated product information.

As part of the method according to the invention, a user initially selects, via the client-side user interface, for example from a displayed product catalog, a standard product which in principle may still be configurable. The configuration, if desired, is carried out on the basis of parameters to be selected and to be set. For a motor to be configured these are for example: a request in the form of the protective category and the supply voltage, the ratings as regards power, number of revolutions, torque etc. Features not defined can be set automatically here. A subsequent adaptation of these features to the dedicated requirements is subsequently possible. A unique material number may for example be automatically generated for each product configuration. If the unique material number already exists, the user is able to call up the services for a product configuration directly without having to go again through the configuration.

Based on the selection and, as required, configuration, all product-specific data are read for example from a merchandise management system such as SAP, transformed into a data record for example in the form of an XML description and included in model data. The transformation into the data record or the XML description facilitates quick processing and a standardized activation of random services.

The data record may comprise a control part, in which general requirements may be determined, e.g. in which form the CAD display shall be effected (2D/3D), on which output device the documentation shall be output, etc.

In addition to the actual product data, classification data are in each case contained in the data record or the model data. By way of these, the total model data or product data are reduced to the service-relevant documentation data (variant reduction). By way of the classification, the respective service ascertains for example, what the product type is. A so-called recipe may for example be stored in the service or in the data record for each product type. In the recipe it may be stored, which data or information in the data record are service-specific. This step may be called filtering. The service itself therefore determines its information requirement, not the entity or source, which generates the data record. Equally, the source does not require any service-specific knowledge either. Thus, a standardized activation of different services using the same data record is possible. This form of decoupling also facilitates waiting/revising/adding/removing of services without having to modify the data record or the model data. In addition to reducing the entire data record to the service-relevant documentation data, the filtering may also contain the combining of data/parameters to form service-relevant data/parameters. It is thus possible to not only filter out non-service-relevant data/parameters but to also create new data/parameters.

Further, an abstract construction plan or a set of rules relating to the selected product may be contained/stored in a respective service itself. The set of rules or the abstract construction plan describes how the service-specific documentation data of a product are assembled by the service to form a model or image of the product. The set of rules or the abstract construction plan maps the maximum constructability.

In the set of rules or abstract construction plan it is stipulated for example, which kinds of a shaft can generally be used for a motor of a certain type. The set of rules or the abstract construction plan may have access to source information, for example in the form of a parts store, which is for example stored on a server of the product manufacturer. All possible individual information on all products are for example stipulated and made available in a list in the source information. The preparation of this source information and the standardization may take place by means of the recipe. This allows a variant reduction, since different models may have been constructed from several individual products.

A single piece of information of the list may for example be constructed as follows TGTXXX_Typ, VMTXXX_ARTTXT wherein TGTXXX_TYP in a CAD service determines the respective component and in a product datasheet service determines the respective documentation. In the CAD service, VMTXXX_ARTIXT then determines a motor image and in the product datasheet service VMTXXX_ARTIXT then determines a description for a motor.

The parts store is typically service-specific. Source information on all components is correspondingly separately stored for each service.

The image created in this way can then be output. The form of output, for example as a file or a display, can be determined in the control head.

The invention makes it possible for a user to have product-specific data displayed to him about a product (configured product, single item, etc.). These may be for example: a text document, CAD data, support page, etc. This enables the user to receive the desired information directly and in a concentrated manner without searching for the correct passages on different pages in diverse documents. To this end, according to the invention, product information is generated and made available in a demand-orientated manner by means of different services, such as for example CAD service, online help service, product datasheet service, etc.

With the CAD service for example a CAD model about the configured product can be produced and visualised, and the CAD data, dimensional drawings, 2D data, 3D data etc. can be made available for download.

A single service comprises herein exactly one associated output object or an associated quantity of output objects.

BRIEF DESCRIPTION OF THE DRAWINGS

FIG. 1 shows a highly schematic block diagram of a system for generating a technical documentation of a configurable product as well as associated data flows.

DETAILED DESCRIPTION

FIG. 1 shows a highly schematic block diagram of a system 1000 for generating a technical documentation 1 of a configurable product 2 of an electrical drive system 100.

The system comprises a user interface 7, for example in the form of a web surface or an app. The user interface 7 serves to select the product 2 from a quantity of selectable products 2_1, . . . , 2_m. The selectable products 2_1, . . . , 2_m may be for example transmissions, frequency converters, programmable logic controllers, analog sensors, digital sensors, rotary encoders, electric motors, etc.

After selecting the product 2 the user may, as desired, define adjustable parameters of the selected product 2, labeled in FIG. 1 with 6_1, 6_2 by way of example via the user interface 7.

The system 1000 further comprises a data record generating unit 8, which is configured to automatically generate a data record 3 of the selected product 2 in an XML format, wherein the data record 3 contains classification data 3a and product data 3b. The product data 3b may be dependent on values of the optionally defined parameters 6_1, 6_2.

The data record 3 of the selected product 2 may be generated automatically, for example, in that the data record 3 (or the associated data thereof) of the selected product 2 is read from a database 5 of a merchandise management system and then inserted into the data record.

The system 1000 further comprises a service computing unit 9 on which a multiplicity of different services 4_1, ..., 4_n are executed. The multiplicity of services may for example contain the following types of services: a CAD service 4_1, which is configured to generate partial documentations 1_1 in the form of CAD data of the selected product 2, an online help service 4_2, which is configured to generate partial documentations 1_2 in the form of online help data of the selected product 2, and a product datasheet service 4_3, which is configured to generate partial documentations 1_3 in the form of product data of the selected product 2.

The system 1000 further comprises a data transmission unit 10 in the form of a conventional data transmission network, which is configured to transmit the data record 3 from the data record generating unit 8 to the service computing unit 9.

A respective service 4_1, ..., 4_n is configured to extract the classification data 3a from the received data record 3, to extract documentation data 3c from the product data 3b based on the extracted classification data 3a, and to generate a partial documentation 1_1, ..., 1_n of the technical documentation 1 based on the extracted documentation data 3c.

The system 1000 further comprises a documentation unit 11, which is configured to form the technical documentation 1 by combining the service-specific partial documentations 1_1, ..., 1_n.

By way of the classification data 3a the respective service 4_1, ..., 4_n is able to ascertain for example, what the product type is. A so-called recipe 12 may have been stored for example for each product type in the service 4_1, ..., 4_n. In the recipe 12 it may have been stored, which data or information in the data record 3 are service-relevant. This step may be called filtering.

Furthermore, in addition to the recipe 12, which controls the filtering of the data record 3, an abstract construction plan or a set of rules 13 relating to the selected product 2 may be contained/stored in a respective service 4_1, ..., 4_n. The set of rules or the abstract construction plan 13 describes how the documentation data 3c of a product 2 are to be assembled by the service 4_1, ..., 4_n to form a digital model or image 14 of the product 2.

According to the invention, the same data record is used for the different services, in order to initiate different information outputs (CAD, text, drawing, values, etc.).

This results in the following advantages:

Reduced expenditure during information provision.

The computing power required is less.

Data keeping separated from data output→new services can be easily incorporated.

Standardization of the documentation data of the models, thus facilitating re-use at all interfaces.

Explicit preparation of the model data at the calling interfaces is not required.

The input data of a service can be re-used as calling documentation data of another service without any modification.

What is claimed is:

1. A method for generating a technical documentation of a configurable product of an electrical drive system using one or more processors, comprising the steps of:

selecting from a client-side user interface the configurable product from a quantity of selectable products by a user;

selecting from the client-side user interface one or more parameters of the selected configurable product by the user;

automatically generating a data record of the selected configurable product using the one or more processors, wherein the data record contains classification data and product data and is stored in a memory accessible by a processor;

transmitting the data record to one or more services of a plurality of computer-executable services, the plurality of computer-executable services being configured for on-demand generation of technical documentation using the one or more processors, the one or more computer-executable services being configured to extract the classification data from the received data record, determine from the classification data a product type of the selected configurable product, extract documentation data from the product data based on the extracted classification data using a stored recipe configured to select data associated with the determined product type, and generate using the one or more processors a partial documentation of the technical documentation for each of one or more of the one or more computer-executable services based on the extracted documentation data;

forming using the one or more processors the technical documentation by combining the partial documentations generated from the one or more computer-executable services, wherein at least one of the plurality of computer-executable services includes a stored set of rules which is selected based on the extracted classification data, the stored set of rules includes a construction plan for generating a digital model of the selected configurable product using the one or more processors, the construction plan defining how the documentation data of a product are assembled by the computer-executable service to form the digital model, and the generation of the technical documentation includes generating the digital model of the selected configurable product using the one or more processors based on the extracted documentation data and the selected set of rules; and presenting at least a portion of the technical documentation at the client-side user interface, wherein the selectable configurable products include transmissions, frequency converters, programmable logic controllers, analog sensors, digital sensors, rotary encoders, electric motors, mechanical elements, and wherein the plurality of computer-executable services include a CAD service configured to generate partial documentations in the form of CAD data of the selected configurable product, an online help service configured to generate partial documentations in the form of online help data of the selected configurable product, and a product datasheet service, which is configured to generate partial documentations in the form of product data of the selected configurable product.

2. The method according to claim 1, wherein the data record of the selected product is dependent on the selected one or more parameters.

3. The method according to claim 2, wherein the data record is a file in XML format or JSON format.

4. A system for generating a technical documentation of a configurable product of an electrical drive system using one or more processors, comprising:
- a user interface configured to permit using the one or more processors user selection of the configurable product from a plurality of selectable products and user selection of one or more parameters of the selected configurable product;
- a data record generating unit configured to automatically generate using the one or more processors a data record of the selected configurable product which contains classification data and product data;
- a service computing unit having memory configured to execute a plurality of computer-executable services executable by the one or more processors;
- a data transmission unit configured to transmit using the one or more processors the data record from the data record generating unit to the service computing unit, the service computing unit being configured for on-demand generation of technical documentation using the one or more processors, wherein one or more of the plurality of computer-executable services is configured to
  - extract the classification data from the received data record,
  - determine from the classification data a product type of the selected configurable product,
  - extract documentation data from the product data based on the extracted classification data using a stored recipe configured to select data associated with the determined product type, and
  - generate using the one or more processors a partial documentation of the technical documentation for each of one or more of the one or more computer-executable services based on the extracted documentation data;
- a documentation unit configured to form, using the one or more processors, the technical documentation by combining the partial documentations generated from the one or more computer-executable services, wherein
- at least one of the plurality of computer-executable services includes a stored set of rules which is selected based on the extracted classification data,
- the stored set of rules includes a construction plan for generating a digital model of the selected configurable product using the one or more processors, the construction plan defining how the documentation data of a product are assembled by the computer-executable service to form the digital model, and
- the generation of the technical documentation includes generating the digital model of the selected configurable product using the one or more processors based on the extracted documentation data and the selected set of rules; and presenting at least a portion of the technical documentation at the client-side user interface, the selectable configurable products include
- transmissions,
- frequency converters,
- programmable logic controllers,
- analog sensors,
- digital sensors,
- rotary encoders,
- electric motors,
- mechanical elements, and wherein the plurality of computer-executable services include
- a CAD service configured to generate partial documentations in the form of CAD data of the selected configurable product,
- an online help service configured to generate partial documentations in the form of online help data of the selected configurable product, and
- a product datasheet service, which is configured to generate partial documentations in the form of product data of the selected configurable product.

* * * * *